Aug. 24, 1926.
C. M. ANGELL
1,597,336
MACHINE FOR FILLING GRIDS
Filed Nov. 20, 1922  6 Sheets-Sheet 1
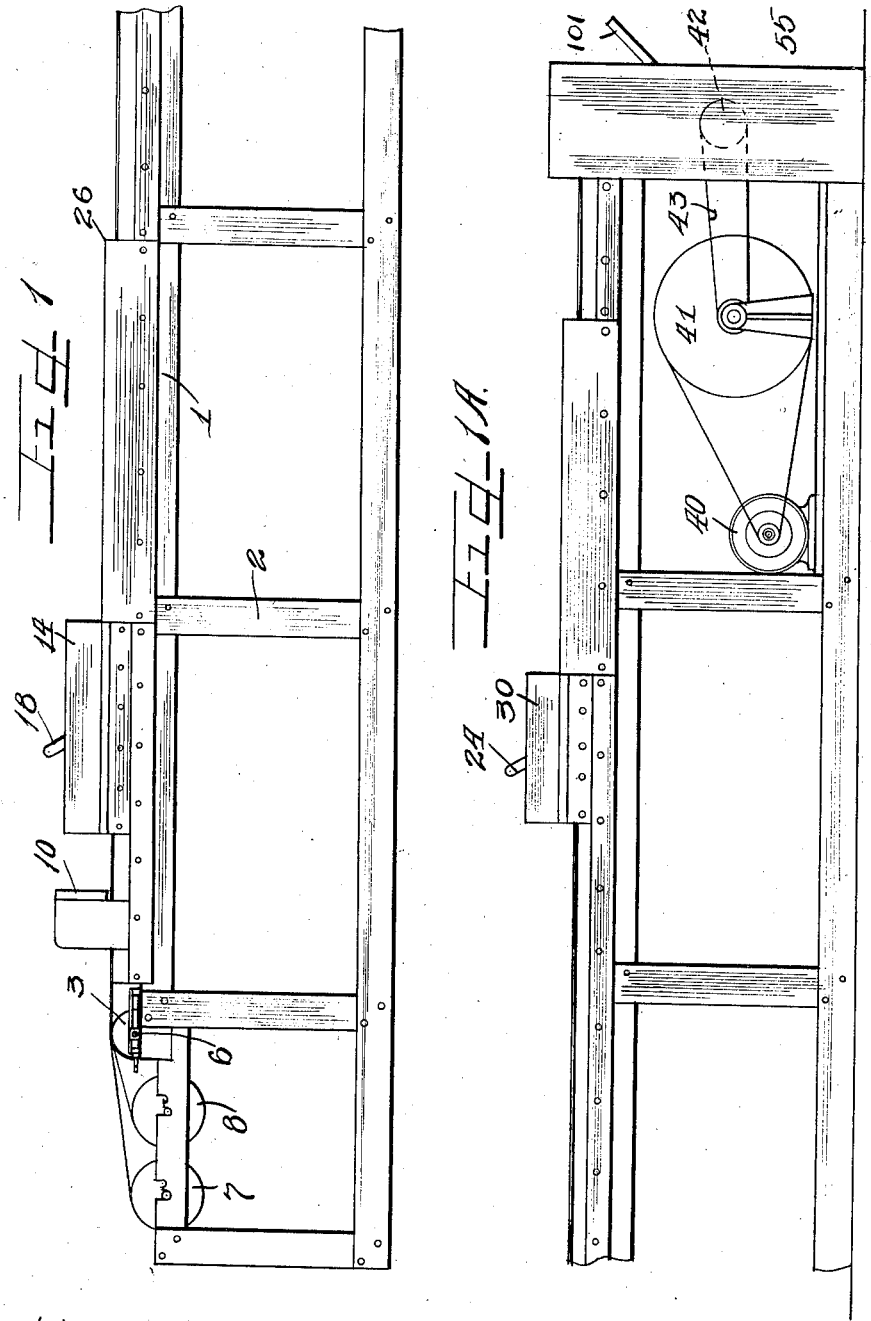

Aug. 24, 1926.  
C. M. ANGELL  
1,597,336  
MACHINE FOR FILLING GRIDS  
Filed Nov. 20, 1922  6 Sheets-Sheet 2
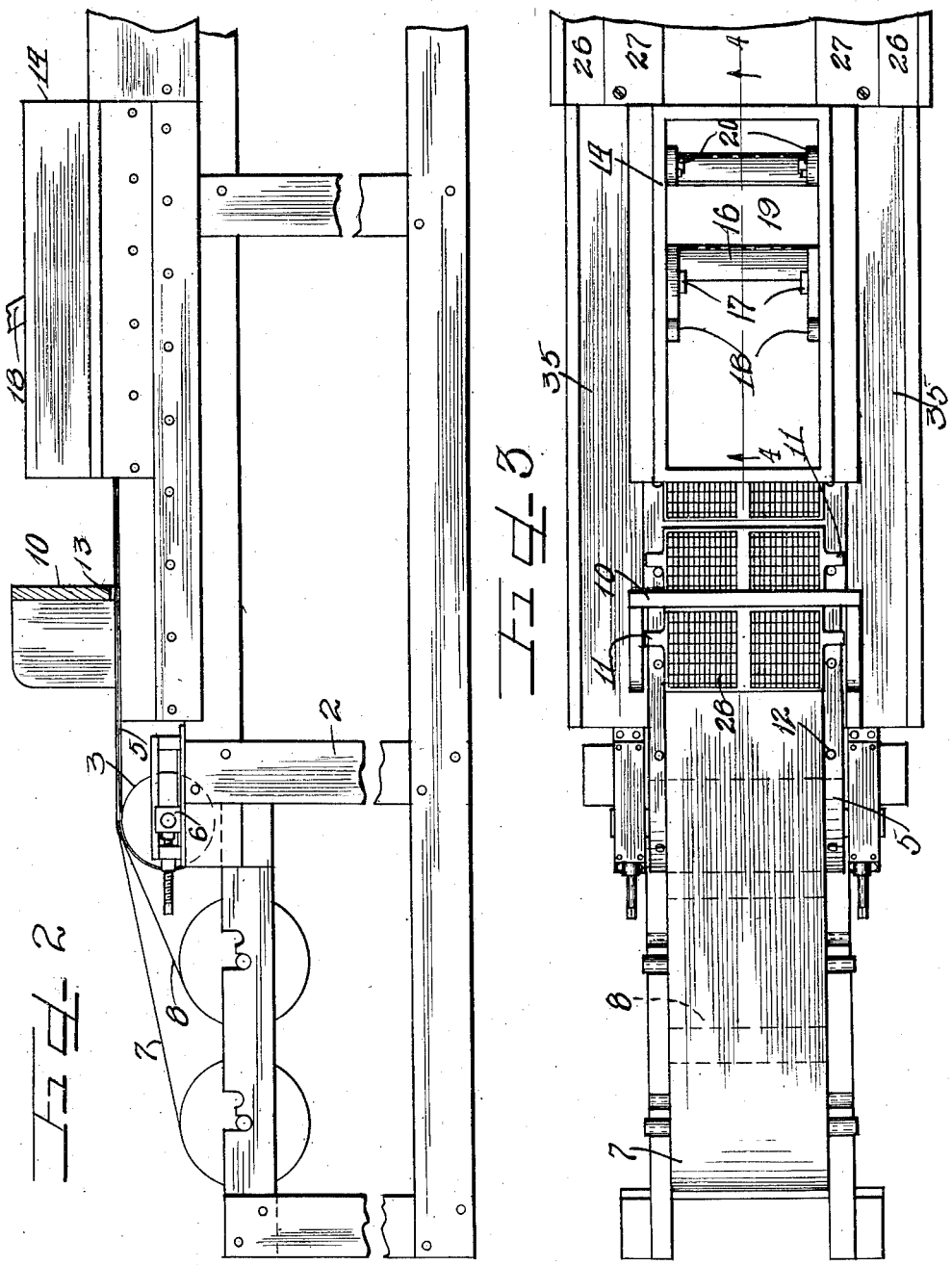

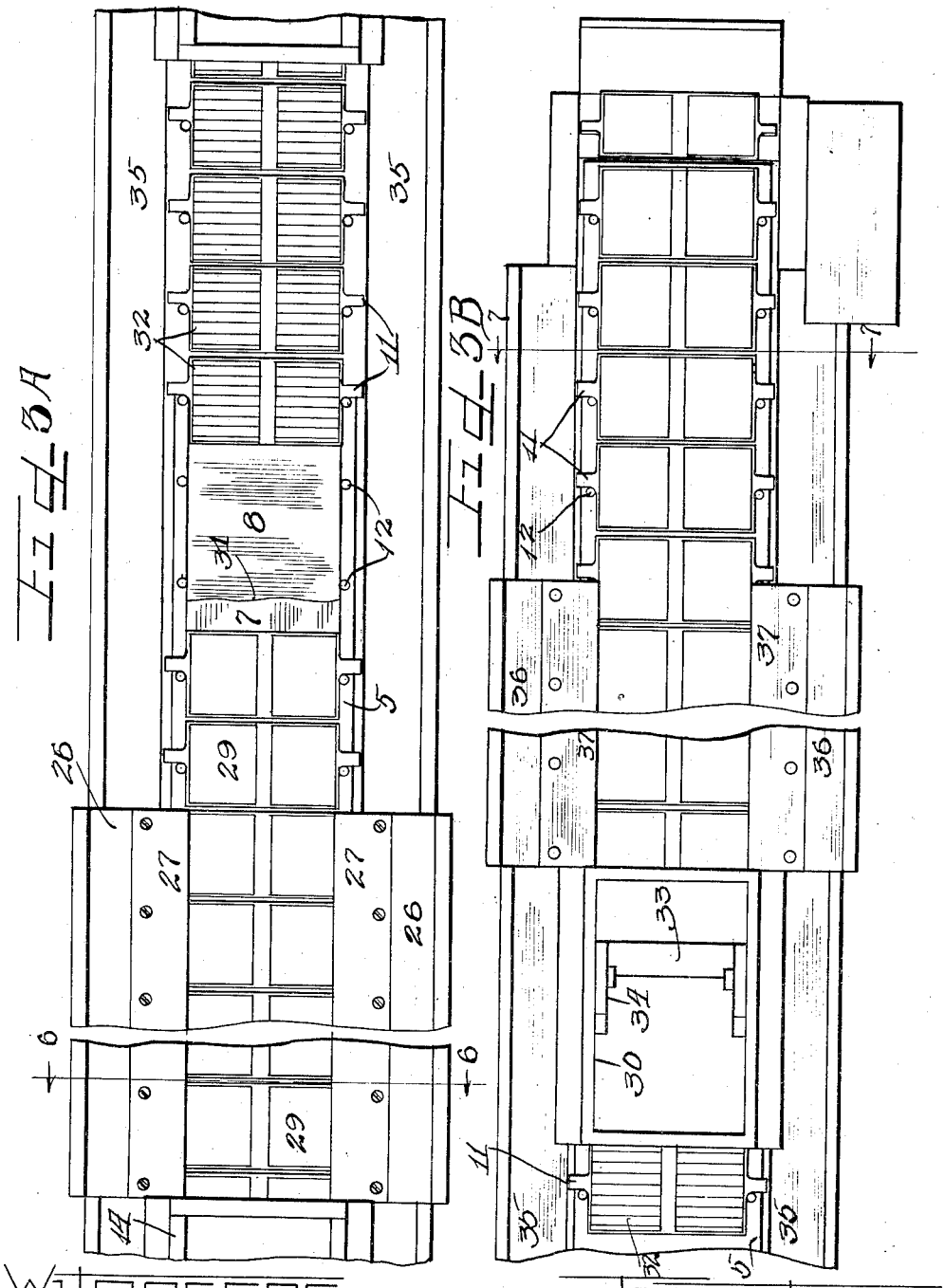

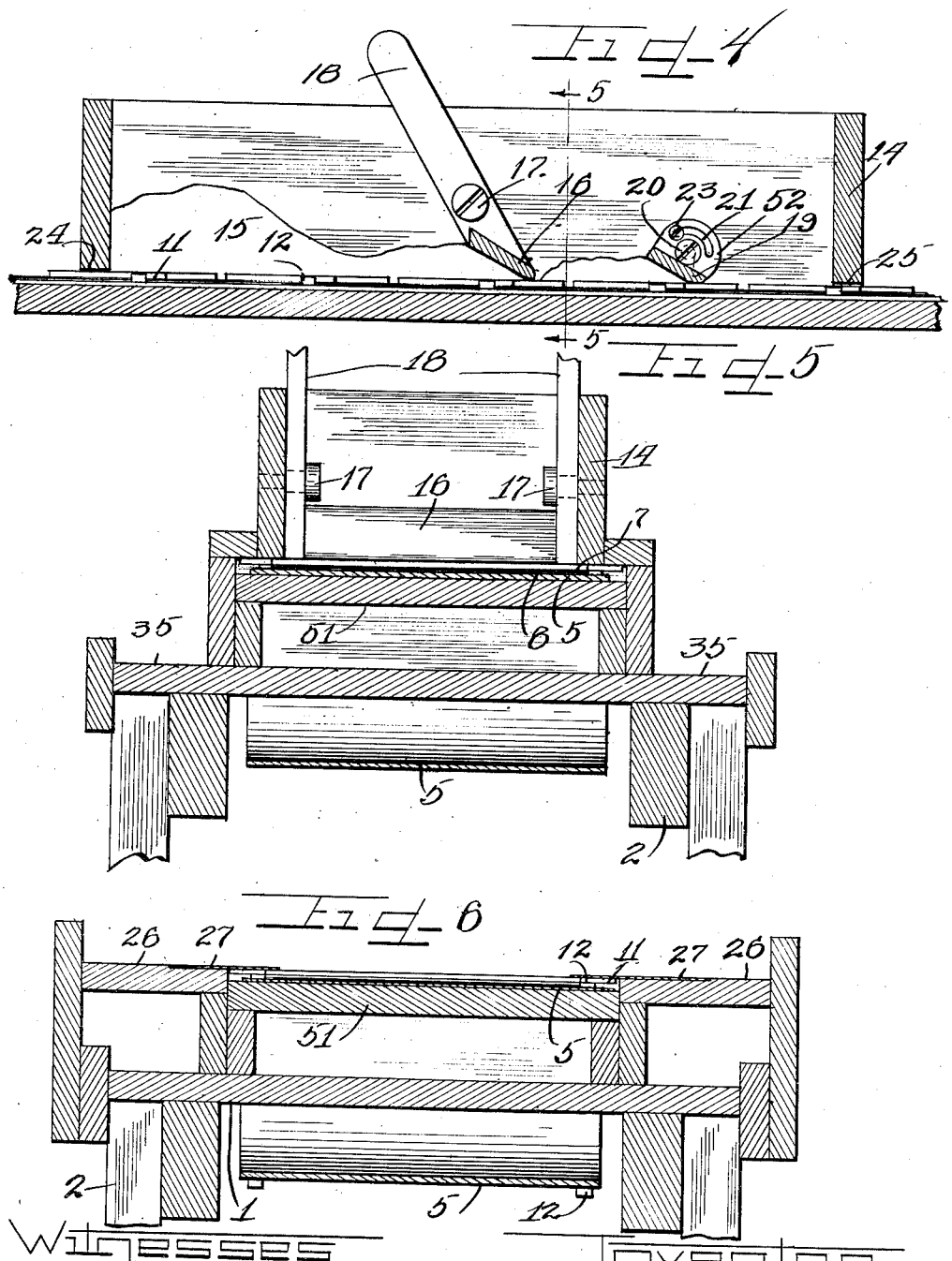

Aug. 24, 1926.
C. M. ANGELL
1,597,336
MACHINE FOR FILLING GRIDS
Filed Nov. 20, 1922     6 Sheets-Sheet 5
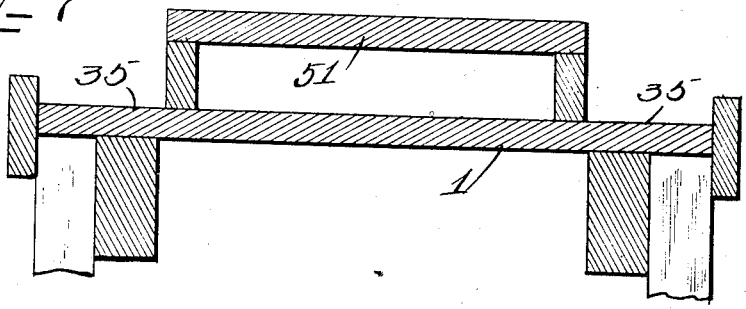
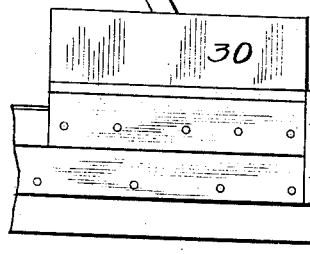
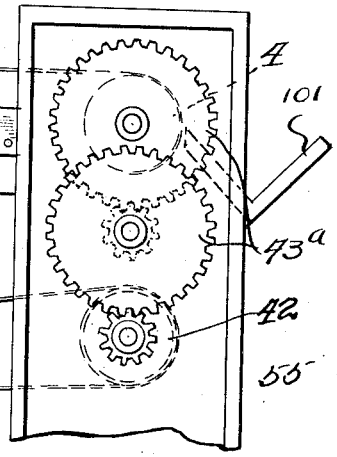
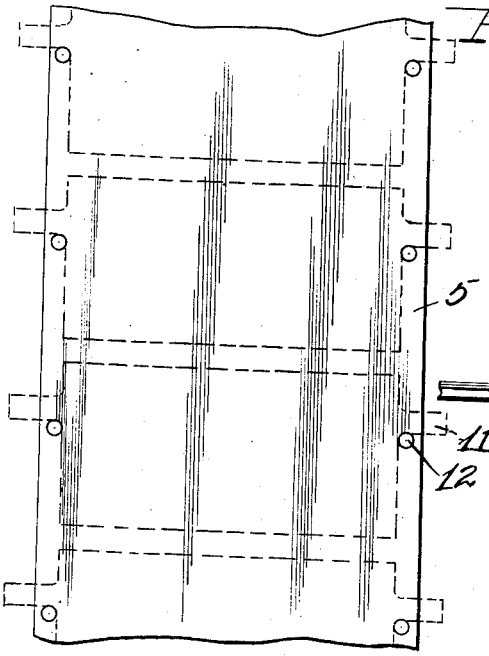

Aug. 24, 1926.
C. M. ANGELL
1,597,336
MACHINE FOR FILLING GRIDS
Filed Nov. 20, 1922     6 Sheets-Sheet 6
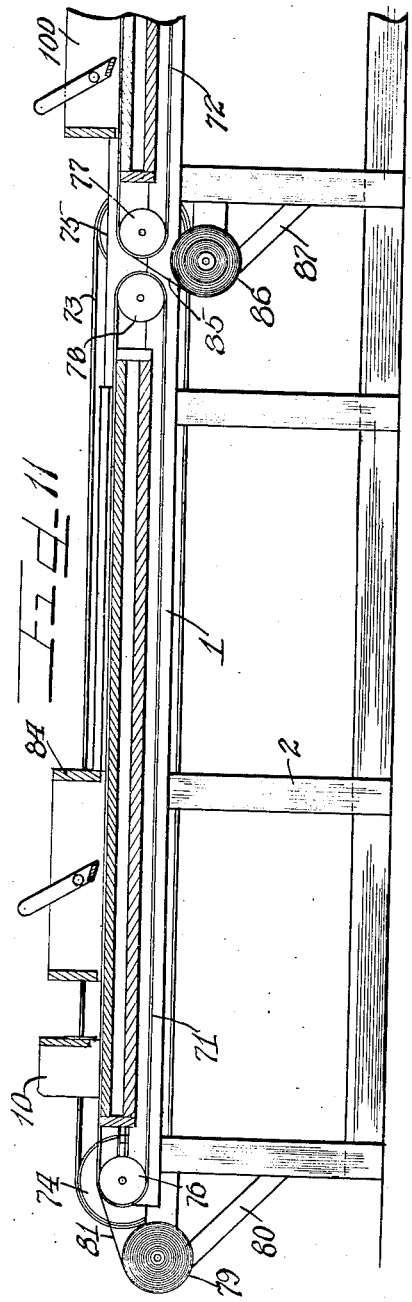
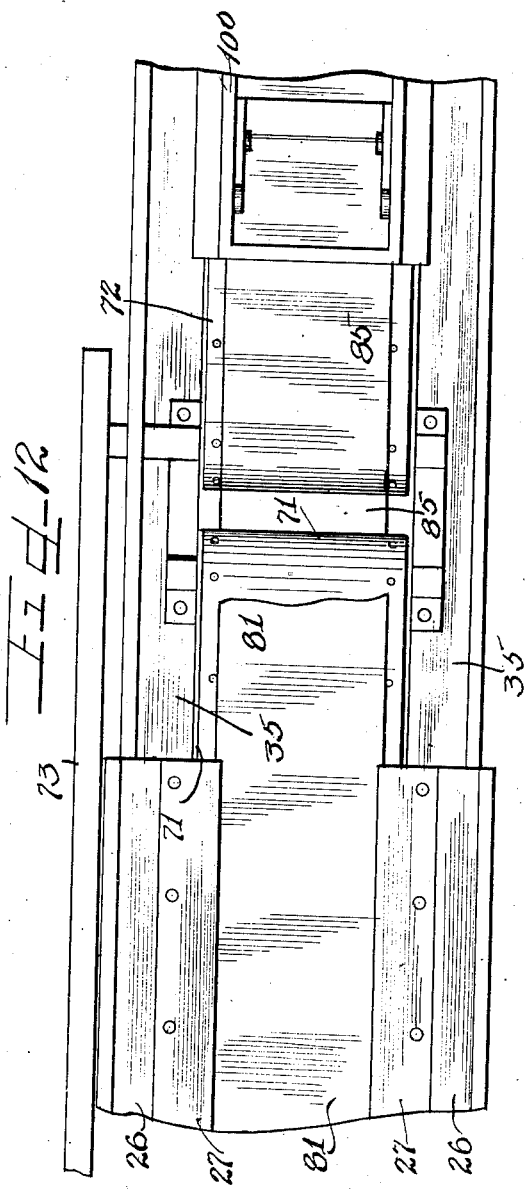

Patented Aug. 24, 1926.                                                                 1,597,336

UNITED STATES PATENT OFFICE.

CHESTER M. ANGELL, OF CHICAGO, ILLINOIS, ASSIGNOR TO VESTA BATTERY CORPORATION, A CORPORATION OF ILLINOIS.

MACHINE FOR FILLING GRIDS.

Application filed November 20, 1922. Serial No. 602,070.

This invention relates to a machine which is used in the reparation of plates to be used in storage batteries. Such plates are usually made by casting a grid of lead or other suitable metal and then filling the spaces in the grid with a paste of suitable material.

It is an object of this invention to provide a machine which shall fill the grids with paste.

It is a further object of this invention to provide means whereby the plates shall be conveyed past a supply of paste, filled therefrom, and then the superfluous paste be removed from them.

It is a further object of this invention to provide a machine in which the plates, after having been filled with paste on one side, shall have the opposite side treated in a similar manner.

It is a further object of this invention to provide a machine in which the plates, after having been filled, shall be successively presented to a workman who can inspect and if necessary correct the filling.

It is a further object of this invention to provide an endless conveyor for moving the plates and a pair of traveling strands of paper one of which shall serve to back up the plate during the first filling operation and the other of which shall serve to back it up during the operation upon the other face of the plate.

Other and further important objects of this invention will be apparent from the disclosures in the drawings and the accompanying specification.

The invention (in a preferred form) is illustrated in the drawings and hereinafter more fully described.

On the drawings:

Figure 1 is a side elevation of one end of the machine and Figure 1^A, a side elevation of the remainder of the machine, so that Figures 1 and 1^A together constitute a side elevation of the whole of the machine.

Figure 2 is an enlarged side elevation, partly in section of one end of the machine.

Figure 3 is a plan view of this end of the machine, and Figure 3^A is a plan view of the central portion of the machine, and Figure 3^B is a plan view of the other end of the machine, so that Figures 3, 3^A, and 3^B together constitute a plan view of the whole of the machine.

Figure 4 is a section upon the line 4—4 of Figure 3.

Figure 5 is a section upon the line 5—5 of Figure 4.

Figure 6 is a section upon the line 6—6 of Figure 3^A.

Figure 7 is a section upon the line 7—7 of Figure 3^B.

Figure 8 is an enlarged detail of the end of the machine shown in Figure 1^A.

Figure 9 is a plan view of a portion of the conveyor.

Figure 10 is an edge view of the same.

Figure 11 is a longitudinal section of the end of a modified form, showing that end of the machine corresponding to Figure 2.

Figure 12 is a top plan view of the right hand part of Figure 11.

As shown on the drawings:

The machine comprises a long platform 1 supported upon any suitable frame 2. At one end of the machine a drum 3 and at the other end a drum 4 serve to support and drive an endless carrier 5. The drum 3 is suitably mounted in adjustable bearings 6 for regulating the tension of the conveyor belt. This belt moves from the end of the machine shown in Figure 1 toward the end of the machine shown in Figure 1^A in the upper level of its travel, and in the opposite direction in the lower level. During its travel toward the right (in Figure 1) it is supported by a supplementary platform 51 above the platform 1. The upper level of the conveyor is the working level, the lower level being merely for the return of the conveyor to the starting point of the machine.

At the starting end of the machine there are mounted two rolls of paper delivering strands 7 and 8 respectively. The paper is delivered to the machine just above the conveyor belt 5 and travels with the belt. The belt and paper first pass under a box 10, which is open at the top and at the side which the belt approaches.

In the use of the machine, a stack of grids are placed in this box. The grids are supplied at each end with lugs 11. The conveyor 5 is supplied at each edge with upstanding studs 12 which contact with the lugs 11 and so enable the conveyor to positively move the grids preventing slipping between them and the conveyor. As may be seen in Figures 4 and 10, the height of these lugs is slightly less than the thickness of the grids. The wall of the box 10 which crosses the machine has a slot 13 of sufficient width to permit the exit of one grid at a time.

When the grids emerge from the box 10, they go to a box 14, best shown in Figure 4. This box contains a supply of paste 15 and a scraper 16. At each end of the scraper 16 is a handle 18 extending above the edge of the box 14. These handles are pivoted to the side walls of the box by screws 17. The ends of the handles above the box may be swung to regulate the height of the lowest edge of the scraper 16. A second scraper 19 is provided, which is also supported from the sides of the box by means of ears 52 and pivot screws 20. Adjustment of the scraper 19 is secured by slots 21 in the ears 52, and set screws 23 through the slots.

The box 14 has an entrance slot 24 and an exit slot 25 in the walls which cross the machine.

As the grids travel through the box, they tend to carry paste from the supply 15 with them. The scraper 16 acts to crowd the paste down into the grids and to remove the paste which stands more than a certain height above the surface of the grid. The scraper 19 will remove the surplus which the scraper 16 permits to pass. This action will cause a gradual accumulation of paste in the space between the scrapers 16 and 19, which the attendant from time to time will remove and place with the supply 15 near the entrance to the box.

The grids as they approach the box 14 have the appearance shown at 28 in Figure 3, because they have no paste thereon. As they emerge from the box 14 they have the appearance shown at 29 in Figure 3ᴬ, the side which is uppermost having been filled with paste and smoothed.

As the grids emerge from the box 14 they go between two platforms 26, which may be made of wood, faced with plates 27 of lead or other material which the chemicals employed will not act upon. These facing plates, as most clearly shown in Figure 6, extend beyond the edges of the platforms 26 and overlie the grids, covering the lugs and the marginal bars of them. They are at a height above the conveyor 5 which exceeds the thickness of the grids only very slightly so that they prevent the paste from accumulating on the lugs or the edges of the grids. They also confine the paste contained between each lug and the next one so that this paste cannot make a ridge on top of the grids. A workman standing beside these platforms inspects the plates as they pass. If the inspection shows that the plates are not perfectly filled or perfectly smooth, the workman does whatever troweling is necessary to correct these results.

The platforms 26 serve to hold the workman's tools and if necessary an extra supply of paste for his use. The face plates 27 also serve to prevent the troweling from spreading the paste upon the parts of the grates which are not to be covered.

As the plates emerge from between the platforms 26 an attendant lifts them from the conveyor. The upper strand of paper 7 will adhere to each plate as it is lifted. The workman must therefore tear this from the remainder of the strand, as indicated by the torn edge 31 in Figure 3ᴬ. The workman can also remove from the paper 7, any paste adhering thereto between the consecutive grids and that conveyed between consecutive lugs 11. He also tears the adhering paper from the plate before he replaces it upon the conveyor. The projecting parts 35 of the platform 1, which extend throughout the machine, can be used to receive the torn paper and the excess of paste. The workman then turns the plate the other face up and puts it back on the conveyor, as indicated at 32. The grids shown at 32 in Figures 3ᴬ and 3ᴮ are partly filled with paste, but portions of the lead bars which have not yet been covered project above the paste which these grates contain.

After the plates have been replaced upon the conveyor they arrive at the box 30, which contain a supply a paste and a scraper 33 adjusted by means of a handle 34 in the way explained in connection with the scraper 16 in the box 14. This box spreads a supply of paste upon the second face of the plates. The plates then pass between the platforms 36 which are furnished with plates 37, similar to the platforms 26 and plates 27 already described, where a workman inspects them and does troweling on the second surface of the plates if it is needed.

The machine is driven by a motor 40, which is belted to a large wheel 41, which drives a smaller wheel 42 by means of a belt 43. Upon the same shaft with the wheel 42 is a pinion gear which is the first of a chain of gears 43ᵃ driving the drum 4 and so driving the conveyor belt 5. This gearing is contained in a housing 55 at one side of the end of the machine.

In the operation of the machine strands of paper 7 and 8 are led from the rolls through the box 10 and threaded through the slot 13. A pile of grids is then placed in the box 10, and the motor 40 is started. The pressure of the grids against the paper causes the paper to travel with the conveyor belt 5. The studs 12 upon the belt 5, contacting with the lugs 11 of the grids pull them out of the box 10. The width of the slit 13 is not sufficient to let more than one grid come out at a time, and the height of the studs 12 is not sufficient to create any tendency for more than one grid to come out at a time. The grids therefore become distributed along the conveyor belt 5. The grids are carried by this belt through the box 14 where they receive a coating of paste in the way already described, and the scrapers 16 and 19 force paste down into the interstices of the grids, so that when the grids emerge from the box 14, they are filled with paste. The workman at the platforms 26 smooths the paste and completes the filling of this face of these grids. The paper 7 is then removed from the plates and they are turned over, and pass to the second paste box 30. Here paste is applied to the second face of the grids and forced down into the grids by the scraper 33. A workman at the platform 36 trowels the second side of the plates, smoothing all imperfections and removing any superfluous paste that there may be. The second paper 8 is then removed from the plates, and they emerge from the machine into the receiver 101, where an attendant will take them away.

In the modification shown in Figures 2, 11 and 12, instead of a single conveyor there are two of them 71 and 72. The first of these is at the entrance end of the machine, and extends to the point where the plates are to be turned over. The other extends from this point to the exit end of the machine. One of the two conveyors is driven from the other by means of a belt 73 which passes over pulleys 74 and 75. One of these pulleys is on the shaft of a roller 76 from one conveyor and the other is on the shaft of a roller 77 for the other conveyor. The second roller for the first conveyor is shown at 78. The second roller for the second conveyor is at the exit end of the machine and corresponds to the roller 4 of Figure 8.

Near the entrance end of the machine a roll of paper 79 is supported on a bracket 80 and supplies a strand of paper 81 which passes over the conveyor 71 protecting it from the paste. This paste is supplied from a box 84 like the box 14 shown in Figure 2 and is deposited on the plates coming from the box 10 as already explained. When these plates pass beyond the box 84 they go between platforms 26 faced with plates 27 as in the modification already described. At the end of the platform 26 the plates are lifted from the conveyor 71, the paper 81 being torn off as this is done.

Then the plates are turned over and deposited on the conveyor 72. They do not come directly in contact with this conveyor however, but are separated from it by a strand of paper 85 which comes from a roll 85 supported in a bracket 87 at the beginning of the second half of the machine. From here the plates pass through a paste box 100 similar to the paste box 30 and then progress through the rest of the machine as is explained in connection with the first described modification.

It will be evident that, with the style of machine described last, in lifting the plate from the first conveyor there is no danger of tearing the second strand of paper. Consequently with this style of machine the plates may be more rapidly handled.

I am aware that numerous details of this invention may be varied through a wide range without departing from the principles of my invention, and I therefore do not purpose limiting the patent granted otherwise than necessitated by the prior art.

I claim as my invention:

1. In a battery grid filling machine, conveyor mechanism, two strands of paper superposed over a portion of said conveyor, a grid receptacle through which said conveyor passes for successively removing one grid at a time, means for filling said grids with paste from one face while they rest upon one strand and means for filling the opposite face thereof after said grids have been reversed and are resting upon the other strand.

2. In a battery grid filling machine, a grid holder, a pair of spaced paste receptacles having an inspection space therebetween, a conveyor passing through said holder and receptacles and having means for engaging and conveying said grids from the holder, and means in said receptacles for feeding paste successively to opposite sides of said grids upon the reversal of said grids intermediate the pasting operations.

3. In a battery grid filling machine, conveyor mechanism, means for supporting paper to allow two strands of paper to be superposed over a portion of said conveyor, a grid receptacle through which said conveyor passes for successively removing one grid at a time, means for filling one face of said grids with paste while they rest upon one strand and means for filling the opposite face thereof after said grids have been reversed and are resting upon the other strand.

In testimony whereof I have hereunto subscribed my name.

CHESTER M. ANGELL.